United States Patent [19]

Dupuis et al.

[11] Patent Number: 4,521,643

[45] Date of Patent: Jun. 4, 1985

[54] APPARATUS FOR TRANSMITTING INFORMATION VIA TELEPHONE LINES

[75] Inventors: Claude R. Dupuis, Kanata; Lorne C. Hinz, Nepean, both of Canada

[73] Assignee: Northern Telecom Limited, Montreal, Canada

[21] Appl. No.: 467,585

[22] Filed: Feb. 18, 1983

[30] Foreign Application Priority Data

Jan. 10, 1983 [CA] Canada ................... 419146

[51] Int. Cl.³ ............... G06B 26/00; H04M 11/04; H04M 11/06
[52] U.S. Cl. .................... 179/2 DP; 179/5 R
[58] Field of Search ............ 179/2 A, 2 AM, 5 R, 179/2 DP, 2 C

[56] References Cited

U.S. PATENT DOCUMENTS

| | | | |
|---|---|---|---|
| 3,845,247 | 10/1974 | Jurschak et al. | 179/5 R |
| 3,930,246 | 12/1975 | Campbell | 340/214 |
| 3,937,889 | 2/1976 | Bell et al. | 179/2 A X |
| 4,044,351 | 8/1977 | Everson | 179/5 R X |
| 4,068,096 | 1/1978 | Rattenborg et al. | 179/2 A |
| 4,262,283 | 4/1981 | Chamberlain et al. | 179/5 r X |
| 4,442,320 | 4/1984 | James et al. | 179/5 R |

FOREIGN PATENT DOCUMENTS

2359554  3/1978  France ................... 179/2 A

Primary Examiner—Keith E. George
Attorney, Agent, or Firm—R. John Haley

[57] ABSTRACT

Voice-band modems are used to transmit information via a loaded telephone line when a telephone connected to the line is on-hook. When the telephone is off-hook, the integrity of the line is checked by transmitting a pilot tone from the subscriber end to the central office end of the line, where the pilot tone is monitored. Filtering of pilot tones in the central office is avoided by using two different pilot tones for originating and answered calls. An alarm condition at the subscriber produces a shifted pilot tone frequency. Loss or a change in frequency of the monitored pilot tone causes a telephone call on the line to be temporarily interrupted for checking the line and alarm condition. The central office and equipment can be switched to poll consecutively a plurality of telephone lines.

42 Claims, 6 Drawing Figures

APPARATUS FOR TRANSMITTING INFORMATION VIA TELEPHONE LINES

This invention relates to apparatus for transmitting information via telephone subscriber lines.

It is known, for example from Bell, III et al. U.S. Pat. No. 3,937,889 issued Feb. 9, 1976, to transmit above voice-band data, simultaneously with voice-band telephony signals, via telephone subscriber lines. With appropriate separation of the data and telephony signals by filtering, interference therebetween is avoided.

Such an arrangement is not suitable for use with loaded subscriber lines, because the presence of loading coils on such lines gives the lines a low-pass filter characteristic with a cut-off frequency just above the voice-band. Data can be transmitted within the voice-band via loaded subscriber lines when telephony signals are not present, but the data transmission must be interrupted whenever telephony signals appear.

However, it is desirable to be able to transmit information simultaneously with telephony signals via loaded subscriber lines, especially when the information may contain alarm signals relating to the security of the subscriber's premises. In addition, it is desirable to maintain a continuous check of the integrity of the subscriber line via which such information is transmitted, in order to avoid a security system using the subscriber line being defeated by a simulated off-hook condition of the subscriber's telephone.

Accordingly, this invention seeks to provide apparatus which facilitates the transmission of information via a telephone subscriber line, and which is particularly but not exclusively applicable to loaded subscriber lines.

According to one aspect this invention provides apparatus comprising a telephone subscriber line connected at a first end to a telephone and at a second end to a central office, means for transmitting information via the line when the telephone is on-hook, means for applying a pilot tone to the line at the first end when the telephone is off-hook, means coupled to the line at the first end for detecting the presence of ringing signals on the line, means for selecting one of two frequencies of the pilot tone applied to the line when the telephone goes off-hook in dsependence upon the detection of the presence of ringing signals, and means for monitoring the pilot tone at the second end of the line.

Thus in accordance with embodiments of the invention, when the telephone is on-hook information, such as data, control signals, meter readings, and alarm signals, can be transmitted in both directions on the telephone subscriber line. For example the information is transmitted and received via modems, which are conveniently voice-band modems when the line is a loaded line. When the telephone is off-hook a pilot tone having a selected one of two frequencies is transmitted from the subscriber end of the line and is monitored at the central office end of the line. This pilot tone monitoring checks the integrity of the line and enables urgent alarm signals to be communicated to the central office end of the line. The use of two different pilot tone frequencies, respectively for originating and answering subscribers, enables distinct monitoring of each pilot tone from two similarly-equipped subscribers who are interconnected during a telephone call, without necessitating the use of blocking filters in the telephone central office.

Each of the pilot tone frequencies is preferably less than 180 Hz, so that it is below the voice-band, and preferably greater than 60 Hz. At such frequencies the pilot tone can be transmitted on the line at a low level so that it is not audible in normal use of the line, and can be detected and distinguished from signals, induced on the line from power lines, at frequencies of 60 Hz and its harmonics.

Advantageously the means for monitoring the pilot tone and the modem coupled to the line at the second end are provided commonly for a plurality of telephone subscriber lines, the apparatus comprising switching means for selectively connecting the means for monitoring the pilot tone and the modem to each of said lines.

According to another aspect this invention provides apparatus comprising: a telephone subscriber line connected at a first end to a telephone and at a second end to a central office; first and second hook state detection means coupled to the line at respectively the first and second ends for determining whether the telephone is on-hook or off-hook; means, responsive to the hook state detection means determining that the telephone is on-hook, for transmitting information via the line; means, responsive to the first hook state detection means determining that the telephone is off-hook, for applying a pilot tone to the line at the first end; first ringing signal detection means coupled to the line at the first end for detecting the presence of ringing signals on the line; control means for selecting one of two frequencies of the pilot tone, applied to the line when the telephone goes off-hook, in dependence upon the detection of the presence of ringing signals; and means, responsive to the second hook state detection means determining that the telephone is off-hook, for monitoring the pilot tone at the second end of the line.

In order to avoid unduly loading the line, which could adversely affect normal use of the line, preferably each hook state detection means comprises means, having a high input impedance, coupled to the line for monitoring the d.c. voltage across the line. Desirably the second hook state detection means is responsive to dial pulses on the line to inhibit the means for monitoring the pilot tone during the dial pulses.

The apparatus preferably includes second ringing signal detection means, coupled to the line at the second end, each of the first and second ringing signal detection means being responsive to the presence of ringing signals on the line to inhibit the means for transmitting information via the line during ringing signals. Inhibiting the transmitting means during ringing signals avoids the risk of desired information being mutilated by the ringing signals.

In order to check the line, the control means is preferably responsive to the second hook state detection means and to the monitoring means for causing the transmitting means to transmit interrogating information via the line in response to a change in or loss of the monitored pilot signal while the second hook state detection means determines that the telephone is off-hook. Preferably the control means includes means for temporarily interrupting the connection of the line at the second end to the central office during transmission of the interrogating information.

For detecting a predetermined condition, such as an alarm condition, at the subscriber end of the line, preferably the control means is responsive to the monitoring means detecting a shifted frequency of the monitored pilot tone to cause transmission of the interrogating information, and the apparatus includes control means for causing the shifted frequency pilot tone to be applied to the line at the first end in response to a predetermined condition occurring while the first hook state detection means determines that the telephone is off-hook.

The transmitting means conveniently comprises first and second modems, which are preferably voice-band modems if the line is a loaded telephone subscriber line, coupled to the line at respectively the first and second ends.

The control means are preferably responsive to the second hook state detection means determining that the telephone is off-hook for decoupling the second modem from the second end of the line and responsive to the first hook detection means determining that the telephone is off-hook for including a series impedance in the coupling between the first modem and the first end of the line. This reduces loading of the line during its normal use for telephony.

Advantageously the control means, the second hook state detection means, the means for monitoring the pilot tone, and the second modem are provided commonly for a plurality of telephone subscriber lines, the apparatus comprising switching means for selectively connecting the second hook state detection means, the means for monitoring the pilot tone, and the second modem to the second end of each of said lines. Conveniently, the switching means comprises a first switch for selectively connecting the second hook state detection means to the second end of each of said lines and a second switch for simultaneously connecting at least one of the means for monitoring the pilot tone and the second modem to the second end of the respective one of said lines.

In this case conveniently the means for temporarily interrupting the connection of the respective line during transmission of the interrogating information comprises relay means in respect of each line, the relay means being responsive to a d.c. signal produced by the control means during transmission of the interrogating information to connect an impedance across the respective line at its second end, thereby to maintain any telephone connection established for the line via the central office, and to open the line between said impedance and the coupling of the line to the first and second switches, the d.c. signal produced by the control means being applied to the respective relay means via the second switch.

The invention also extends to apparatus for connection to a telephone subscriber line comprising: a high impedance buffer having an input for connection to the line; a hook state detector, having an input coupled to an output of the buffer, for determining whether a telephone connected to the line is on-hook or off-hook; means for transmitting and receiving information via the line when the hook state detector determines that the telephone is on-hook; means for generating a pilot tone when the hook state detector determines that the telephone is off-hook; coupling means for coupling the pilot tone generating means and the information transmitting and receiving means to the line; a ringing signal signal detector, having an input coupled to the output of the buffer, for detecting the presence of ringing signals on the line; and control means for selecting one of two frequencies of the pilot tone, to be generated by the pilot tone generating means when the telephone goes off-hook, in dependence upon the detection of the presence of ringing signals by the ringing signal detector.

The invention will be further understood from the following description with reference to the drawings, in which.

Figure 1:
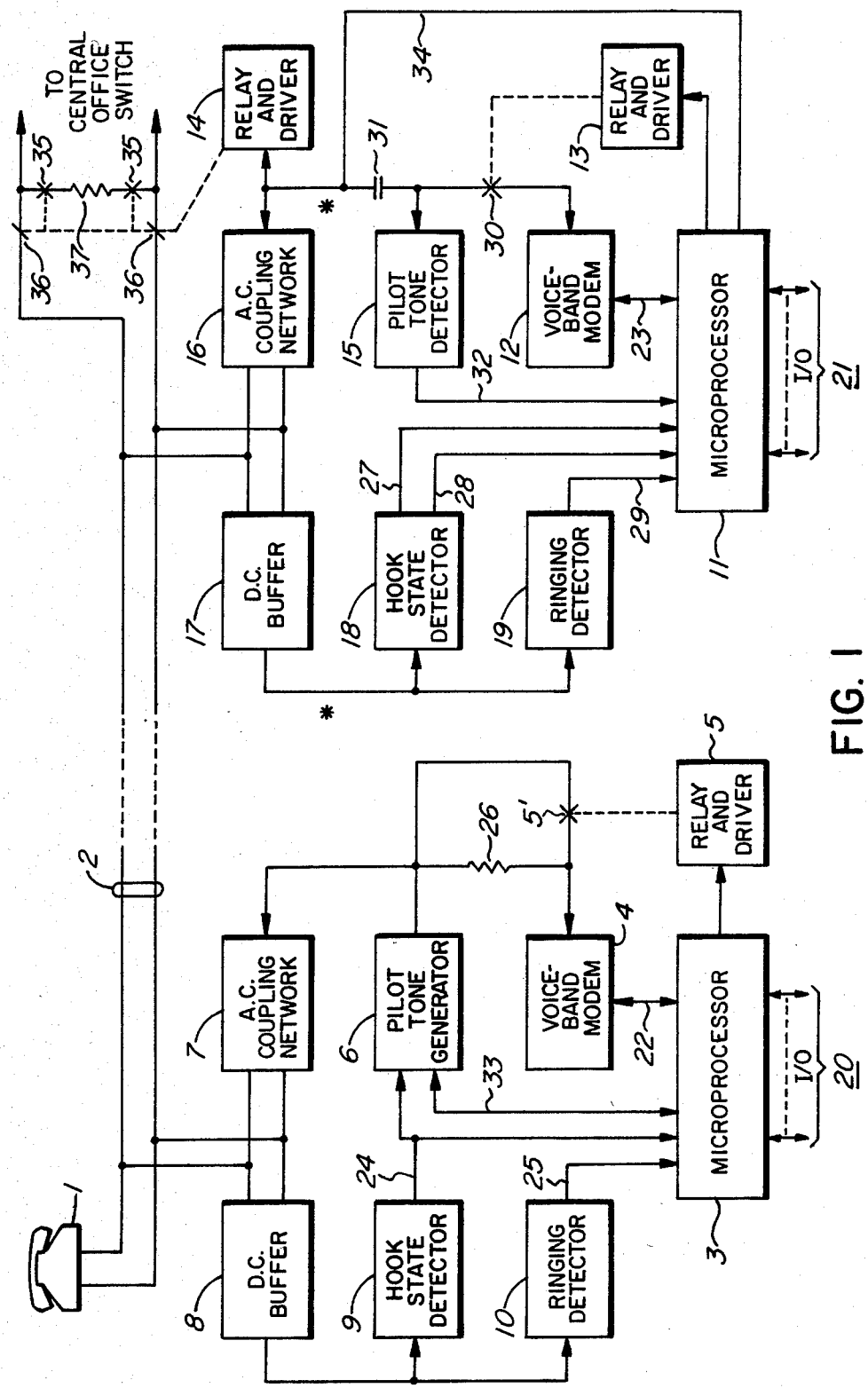
FIG. 1 is a generally block diagram illustrating apparatus in accordance with an embodiment of the invention.

Referring to FIG. 1, the apparatus shown therein comprises a subscriber's telephone 1 connected via a telephone subscriber line 2 to a telephone central office switch (not shown). The line 2 is assumed to be a loaded line, via which above voice-band signals can not practically be transmitted, but it could alternatively be a non-loaded line.

The remainder of the apparatus shown in FIG. 1 serves for transmitting information, other than telephony signals, via the line 2. This information can be of any type, such as remote control or meter reading information, data signals, etc., but is assumed here to include one or more alarm signals the transmission of which must be possible at substantially all times, whether or not the telephone 1 is on-hook.

The apparatus at the subscriber comprises a microprocessor 3, a voice-band modem 4, a relay and driver circuit 5, a pilot tone generator 6, an a.c. coupling network 7, a high impedance d.c. buffer 8, a hook state detector 9, and a ringing detector 10. The apparatus at the central office comprises a microprocessor 11, a voice-band modem 12, relay and driver circuits 13 and 14, a pilot tone detector 15, an a.c. coupling network 16, a high impedance d.c. buffer 17, a hook state detector 18, and a ringing detector 19.

The information to be transmitted via the line 2 is shown as being coupled via input/output lines 20 and 21 to the microprocessors 3 and 11 respectively, for bidirectional transmission via lines 22 and 23 and via the voice-band modems 4 and 12 and the a.c. coupling networks 7 and 16 when the telephone 1 is on-hook and no ringing signals are present on the line 2. Such bidirectional transmission is effected serially between the modems 4 and 12 in known manner, preferably using minimum shift keying. To this end, at the subscriber the on-hook state of the telephone 1 is detected by the detector 9 whose output on a line 24 is coupled to the generator 6, which is consequently disabled, and to the microprocessor 3, and the absence of ringing is detected by the detector 10 whose output on a line 25 is coupled to the microprocessor 3. In response to the signals on the lines 24 and 25 the microprocessor 3 controls the circuit 5 to close its normally-open contact 5', thereby short-circuiting a resistor 26 and coupling the modem 4 to the line 2 via the network 7.

At the central office, output lines 27 and 28 of the detector 18, and an output line 29 of the detector 19, indicating respectively dial-pulsing on the line 2, the hook state of the telephone 1, and the presence or absence of a ringing signal on the line 2, are coupled to the microprocessor 11. When the telephone 1 is on-hook and no ringing signal is present, the microprocessor 11 controls the circuit 13 to close its normally-open contact 30 to couple the modem 12 to the line 2 via a capacitor 31 and the network 16. In this state the microprocessor 11 ignores the outputs of the pilot tone detector 15, present on multiple lines 32.

Thus bidirectional transmission is effected via the line 2 when the telephone 1 is on-hook and no ringing signal is present. In the event that a ringing signal occurs on the line 2, this is detected by the detectors 10 and 19, and in response to the consequent signals on the lines 25 and 29 the microprocessors 3 and 11 control the modems 4 and 12 to stop transmission for the duration of the ringing signal. Transmission between the modems 4 and 12 is resumed during the pauses or silent intervals between successive ringing signals while the telephone 1 remains on-hook.

When the telephone 1 goes off-hook, this is detected by the detector 9, and in response to the consequent signal on the line 24 the pilot tone generator 6 is enabled and the microprocessor 3 controls the circuit 5 to open the contact 51, whereby the resistor 26 is inserted in series in the coupling between the line 2 and the modem 4. The resistor 26 has a resistance of about 20kΩ, which is sufficient to prevent excessive loading of the line 2 by the modem 4 during normal use of the telephone 1. Depending upon whether the subscriber is answering or originating a call, and thus in dependence upon whether or not a ringing signal has been detected by the detector 10, the microprocessor 3 controls the pilot tone generator 6 via one of two lines 33 to generate a tone of 100 Hz or 80 Hz respectively. This tone is coupled via the network 7 to the line 2.

Correspondingly, the off-hook state of the telephone 1 is detected at the central office by the detector 18, and in response to the consequent signal on the line 28 the microprocessor 11 controls the circuit 13 to open the contact 30, whereby the modem 12 is decoupled from and does not load the line 2. The microprocessor 11 then monitors the outputs of the pilot tone detector 15 on the lines 32 for detection of the relevant pilot tone. As the presence of dial pulsing on the line 2 may adversely affect the detection of the pilot tone, the detector 18 also supplies dial pulses via the line 27 to the microprocessor 11, which interrupts its monitoring of the pilot tone detector outputs during each dial pulse.

During the off-hook state of the telephone 1, information transmission between the lines 20 and 21 is generally interrupted, information to be transmitted merely being stored for transmission as decribed above when the telephone 1 goes on-hook. However, if one or more urgent alarm states requiring immediate transmission occur in the information on the lines 20, this is detected by the microprocessor 3 which consequently controls the generator 6, via the other of the two lines 33, to change the frequency of the generated pilot tone to 150 Hz.

In response to detection by the detector 15 of a pilot tone of 150 Hz, or in response to the relevant 80 Hz or 100 Hz pilot tone not being detected by the detector 15 while the telephone 1 is off-hook, the microprocessor 11 determines that the integrity of the line 2 and the occurrence of an urgent alarm from the apparatus connected to this line should be checked. This check is carried out as described below. It is noted that the loss of the 80 Hz or 100 Hz pilot tone, without occurrence of the 150 Hz pilot tone, could be caused by a short-circuit or open-circuit of the line 2. The two different frequencies, 80 and 100 Hz, are used to ensure that, if two similarly-equipped subscribers are interconnected via the central office switch for a telephone conversation, loss of the pilot tone from either of them can be readily detected. If only a single frequency were used for both subscribers, then loss of the pilot tone from one of them could not be detected unless passage of the tone through the central office switch, necessitating complex and expensive filtering, were prevented.

It is also noted here that the pilot tone frequencies and levels are selected so that they are not audible to subscribers during a normal telephone call, and so that the pilot tones can still be detected by the detector 15. To this end the pilot tone frequencies are chosen so that they are below the voice-band, above possible ringing signal frequencies, and distinct from the a.c. mains frequency of 60 Hz and its harmonics. Thus the pilot tone frequencies selected are between 60 Hz and 180 Hz, two of them being between 60 Hz and 120 Hz. The particular frequencies of 80, 100, and 150 Hz selected are not particularly critical, but are chosen for ease of detection.

The check mentioned above is carried out as follows. The microprocessor 11 controls the circuit 14 via a line 34 to close its normally-open contacts 35 and to open its normally-closed contacts 36, whereby a resistor 37 is connected on the central office side of the line 2 to maintain the telephone connection while the line 2 itself is disconnected from the central office. The microprocessor 11 then controls the circuit 13 to couple the modem 12 to the line 2 via the contact 30, and via the modem 12 and the line 2 the apparatus coupled to the line 2 is requested to transmit information including any alarm signal which may be present. If the microprocessor 11 detects no response to this request, it concludes that there is a fault on the line 2 and activates alarms and instigates maintenance accordingly, and then returns the circuits 13 and 14 and their contacts to their previous states.

If there is no fault on the line 2 the above request is received by the modem 4 via the resistor 26 and is detected by the microprocessor 3. In response, the microprocessor 3 controls the circuit 5 to close the contact 51, and controls the modem 4 to transmit the urgent alarm signal which has occurred, and any other information such as any non-urgent signals awaiting transmission, to the line 2 and thence to the modem 12 and microprocessor 11, which activates alarms or instigates maintenance as required. Following such transmission, the microprocessor 3 returns the circuit 5 and its contact, and the microprocessor 11 returns the circuits 13 and 14 and their contacts, to their previous states, whereupon the telephone connection is resumed.

The above-described interruption of the telephone connection can be completed in a fraction of a second using typical data transmission rates, so that it is hardly noticeable by the subscriber. However, as the interruption occurs only when there is a possibility of a fault or an alarm, it may be considered desirable to extend the interruption time, and possibly to transmit under the control of the microprocessor 11 an audible warning to the subscriber during the interruption, to alert the subscriber to this possibility.

Although the above description relates to only a single subscriber line 2, parts of the apparatus at the central office can be provided commonly for a plurality of subscriber lines, the individual lines being polled in turn for individual monitoring of pilot tones or transmission of information. More particularly, as described below with reference to FIG. 5, switches may be inserted at the two points marked * to enable the components 11 to 13, 15, 18, 19, 30, and 31 to be provided commonly for a relatively large number of subscriber lines. It is to reduce the number of such switches required that the capacitor 31 is provided with the line 34 being connected between this capacitor and the switching point; if there were no switching the line 34 could be connected directly to the circuit 14 and not to the network 16, and the capacitor 31 could be omitted.

Figure 2:
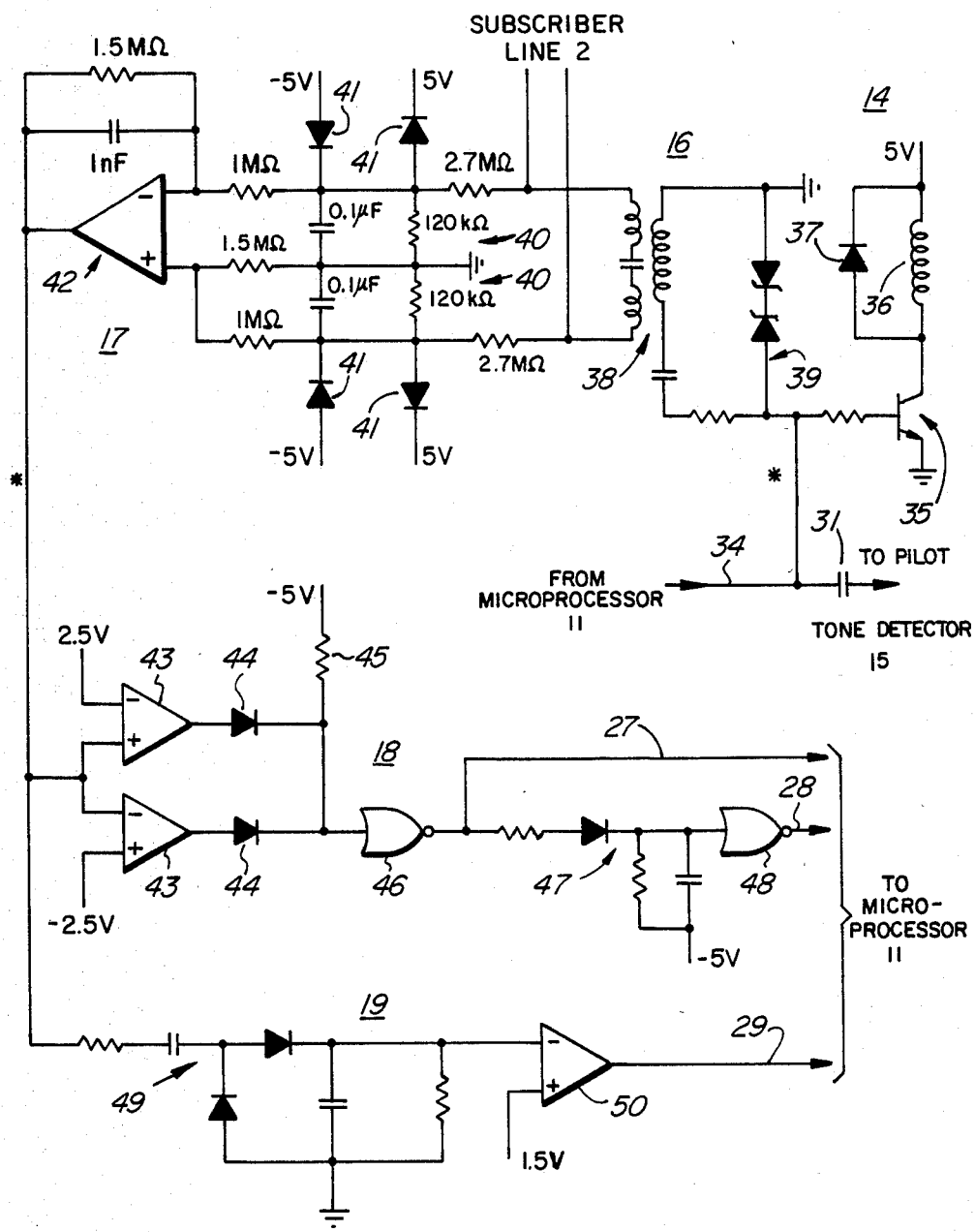
FIGS. 2 and 3 show circuit diagrams of parts of the apparatus of FIG. 1.
Figure 3:
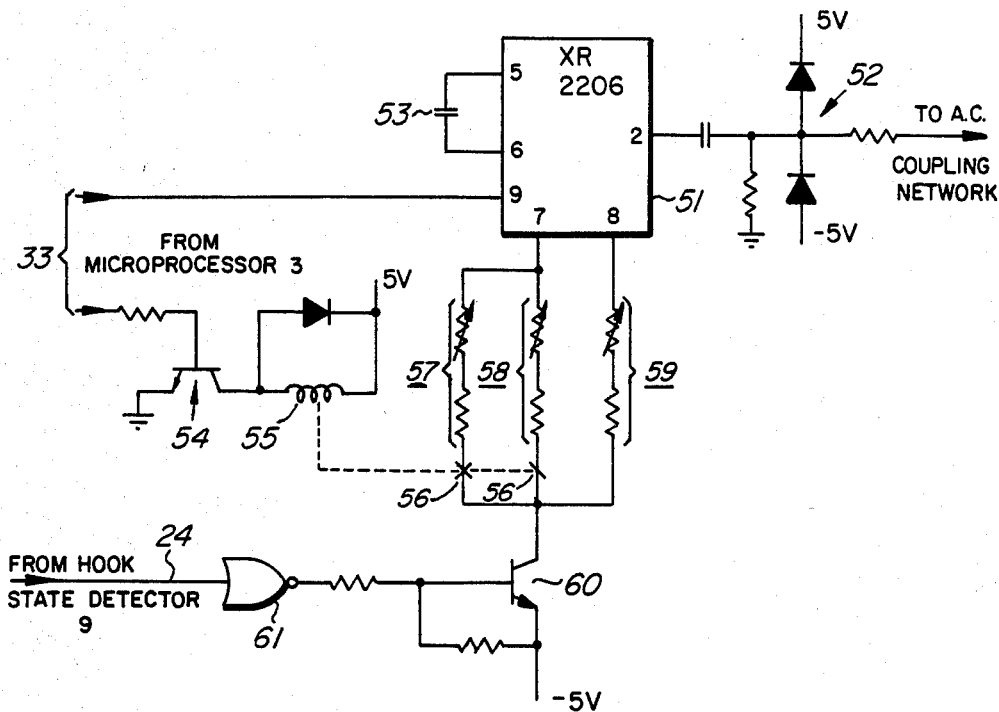
Figure 4:
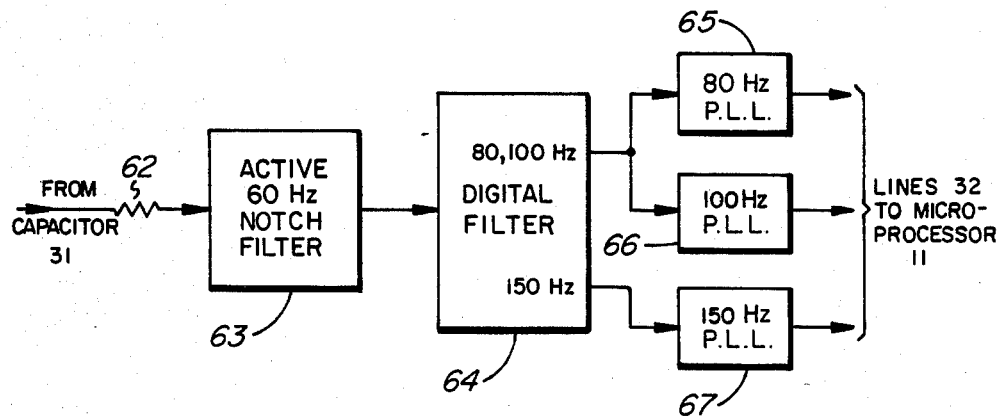
FIG. 4 shows a block diagram of a pilot tone detector of the apparatus of FIG. 1.

FIGS. 2 to 4 illustrate in more detail parts of the apparatus of FIG. 1, the same references being used where appropriate. FIG. 2 illustrates the components 14, 16 to 19, and 31 at the central office; the components 7 to 10 at the subscriber can be substantially the same as the components 16 to 18 respectively, except that the dial pulsing output line of the hook state detector is not required.

Referring to FIG. 2, the relay and driver circuit 14 comprises a common-emitter transistor stage 35 having a relay coil 36 and protection diode 37 in its collector circuit. The circuits 5 and 13 can be similar to this. The a.c. coupling network 16 comprises a coupling transformer 38 and a transient protection circuit 39 formed by a series resistor and two oppositely-poled series-connected zener diodes. The d.c. buffer 17 has a high input impedance to avoid loading the line 2, and comprises input potential dividers 40, clipping diodes 41, and a buffer amplifier 42 providing, when the telephone 1 is on-hook, a ±3 volt output depending upon the polarity of the line 2.

The hook state detector 18 comprises two comparators 43 which compare the output of the d.c. buffer 17 with levels of ±2.5 volts respectively, and whose outputs are coupled via series diodes 44 and a pull-up resistor 45 to provide a logic state which in the long term is dependent upon the hook state of the telephone 1. This logic state is inverted by an inverter 46 to constitute the dial pulsing on the line 27, the output of the inverter 46 also being conducted via an integrating circuit 47 and an inverter 48 to constitute the hook state indication on the line 28.

Ringing signals, attenuated in the d.c. buffer 17, are superimposed on the ±3 volt output of the d.c. buffer 17 and are detected in the ringing signal detector 19 by rectification and integration in a circuit 49, the output of which is compared in a comparator 50 with a fixed voltage of 1.5 volts to produce the ringing signal indication on the line 29.

FIG. 3 illustrates the pilot tone generator 6, which comprises an XR2206 integrated circuit (Exar Integrated Systems) 51 which has pins connected as shown to generate a tone at its output pin 2. The tone is coupled to the a.c. coupling network 7 (FIG. 1) via an amplitude-limiting circuit 52. The frequency of the tone is determined by a capacitor 53 and the resistance connected to whichever one of pins 7 and 8 is selected by a control signal at a pin 9. One of the two lines 33 from the microprocessor 3 controls via a driver transistor 54 a relay having a coil 55 and contacts 56 to determine which of two resistance chains 57 and 58 is connected to the pin 7, which is normally selected by the signal at the pin 9. The other of the lines 33 is connected to the pin 9 to select pin 8, to which a resistance chain 59 is connected, in the presence of an alarm signal as determined by the microprocessor 3. The resistive paths from the pins 7 and 8 are commonly connected via the controlled path of a transistor 60 to a supply potential, the transistor being controlled by the output line 24 of the hook state detector 9 via an inverter 61 so that it is non-conductive, thereby disabling the pilot tone generator, when the telephone 1 is on-hook and so that it is conductive, to enable generation of the selected tone, when the telephone is off-hook. The resistances of the resistance chains 57, 58, and 59 are selected so that, with the capacitor 53, they produce the desired tones of 80 Hz, 100 Hz, and 150 Hz respectively.

FIG. 4 illustrates the form of the pilot tone detector, in which the input from the capacitor 31 is coupled via a resistor 62 to an active 60 Hz notch filter 63, which serves to suppress 60 Hz power supply signals which may be at a very high level compared to the level of the pilot tones to be detected. The output of the filter 63 is coupled to a digital filter 64 having two pass bands, one embracing the frequencies of 80 Hz and 100 Hz and the other for the frequency of 150 Hz, whose outputs are coupled to phase locked loops (P.L.L.s) 65, 66, and 67 for the respective pilot tone frequencies. The outputs of the P.L.L.s constitute the signals on the lines 32.

Figure 5:
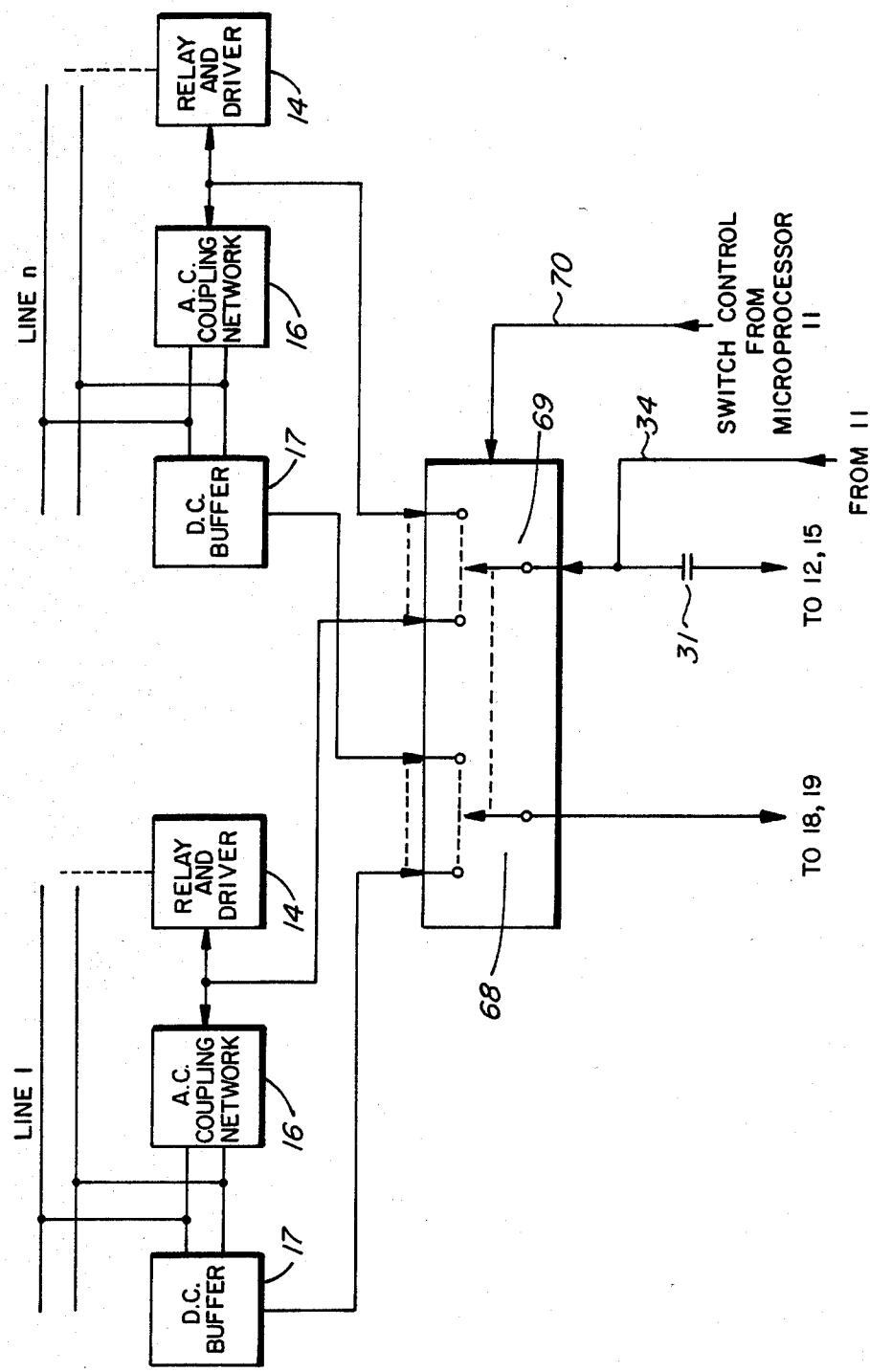
FIG. 5 illustrates a switching arrangement of the apparatus for a plurality of lines.

FIG. 5 illustrates a switching arrangement of the apparatus for switching, as mentioned above, the components 11 to 13, 15, 18, 19, 30, and 31 in turn to each of a plurality of telephone subscriber lines 1 to n, of which only the lines 1 and n are indicated in FIG. 5. Each of the lines is connected at its subscriber end to apparatus as described above with reference to FIG. 1.

The switching arrangement comprises two switches 68 and 69 which are simultaneously controlled by the microprocessor 11 via a line 70 to connect the common detectors 18 and 19 to the buffer 17, and the common microprocessor 11, modem 12, and detector 15 to the circuit 14 and network 16, respectively, of a selected one of the lines 1 to n. Thus each of the lines can be selected or polled in turn for information transmission and/or monitoring of its pilot tone.

Figure 6:
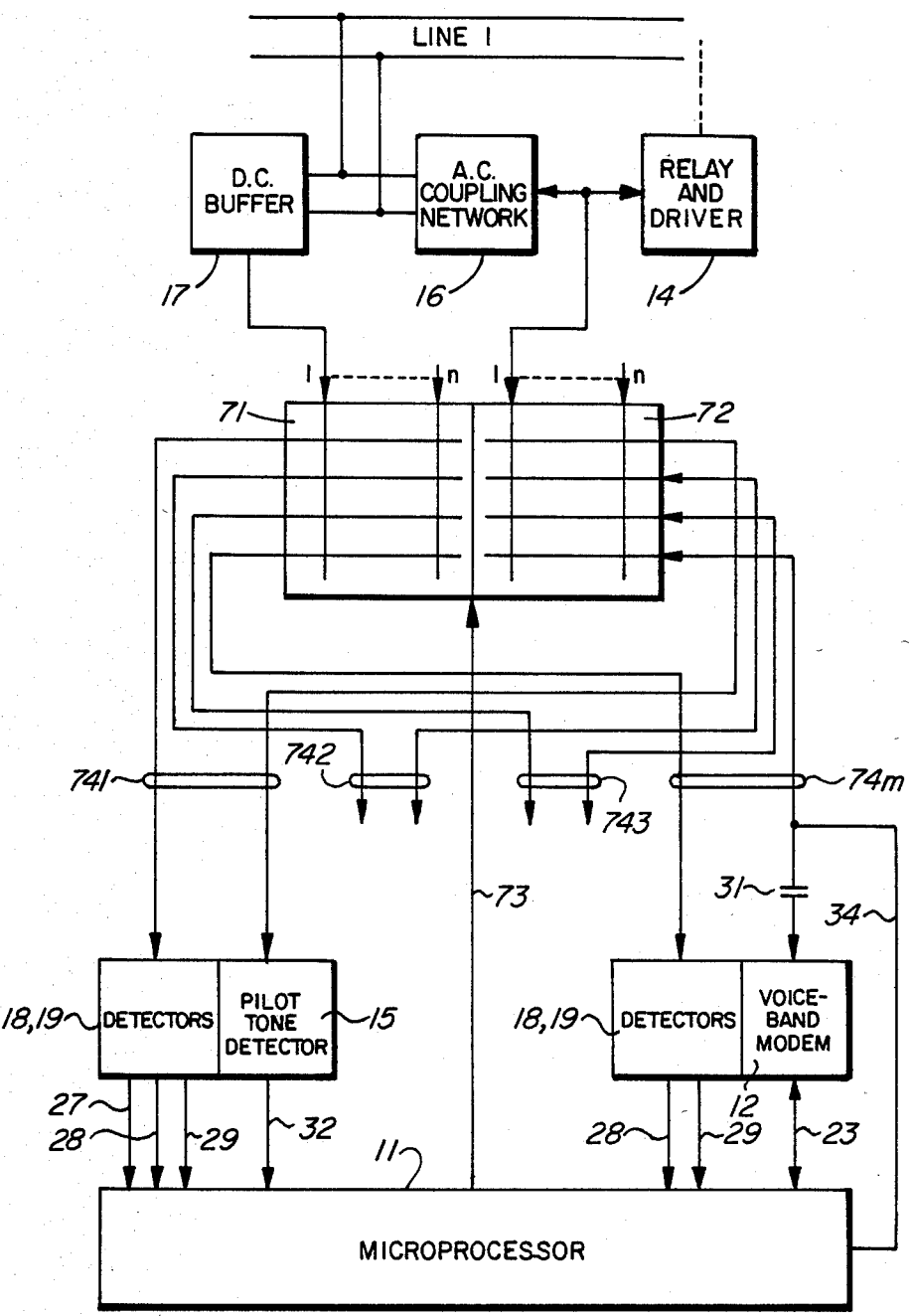
FIG. 6 illustrates an alternative arrangement for a plurality of lines.

FIG. 6 illustrates an alternative arrangement for the plurality of lines 1 to n, of which only the line 1 is illustrated in FIG. 6. In FIG. 6 the line 1 is coupled to switch matrices 71 and 72, which replace the switches 68 and 69 in FIG. 5, via a respective d.c. buffer 17, a.c. coupling network 16, and relay and driver circuit 14, as already described. Each line is similarly connected to the switch matrices 71 and 72.

The switch matrices 71 and 72 are arranged and controlled by the microprocessor 11 via control lines 73 to selectively connect the d.c. buffer 17 and the circuit 14 and network 16 of any of the lines 1 to n to any pair of wires 741 to 74m. For example n=64 and m=4 as shown in FIG. 6. The switch matrices 71 and 72 simultaneously connect any m=4 of the lines 1 to n to the respective pairs of wires 741 to 74m (=744).

The pairs of wires 741 to 74m are connected to respective hook state and ringing detectors 18, 19 and associated voice-band modems 12 or pilot tone detectors 15. Thus one of the pair of wires 74m in FIG. 6 is connected via a capacitor 31 to a modem 23 and directly to the wire 34, and the other is connected to the detectors 18 and 19, which are not required to detect dial pulsing. The wires 741 in FIG. 6 are connected to detectors 18 and 19, which detect the hook state, ringing signals, and dial pulsing, and directly to a pilot tone detector 15. The other pair of wires 742 and 743 can be similarly connected to pilot tone detectors or modems, and associated detectors, as required for particular circumstances. For example these pairs of wires are connected to modems and associated detectors. With such an arrangement of 3 1200-baud modems and a single pilot tone detector, and associated hook state and ringing detectors, all coupled to the microprocessor 11 as shown, a reasonable polling time can be maintained for n=64 subscriber lines to maintain secure monitoring of all of these.

The arrangement of FIG. 6 operates in the same manner as described above, except that the switch matrices 71 and 72 are controlled to couple the respective subscriber lines to any of the modems or pilot tone detectors, as appropriate. In this arrangement the relay and driver circuit 13 and its contact 30 shown in FIG. 1 are dispensed with, their functions being replaced by the controlled switching of the matrices 71 and 72.

Whilst particular embodiments of the invention have been described in detail, it should be appreciated that the invention is not limited to the details thereof, and numerous modifications, variations and adaptations may be made without departing from the scope of the invention, which is defined in the following claims.

What is claimed is:

1. Apparatus comprising a telephone subscriber line connected at a first end to a telephone and at a second end to a central office, means for transmitting information via the line when the telephone is on-hook, means for applying a pilot tone to the line at the first end when the telephone is off-hook, means coupled to the line at the first end for detecting the presence of ringing signals on the line, means for selecting one of two frequencies of the pilot tone applied to the line when the telephone goes off-hook in dependence upon the detection of the presence of ringing signals, and means for monitoring the pilot tone at the second end of the line.

2. Apparatus as claimed in claim 1 wherein the means for transmitting information via the line when the telephone is on-hook comprises modems coupled to the line at the first and second ends.

3. Apparatus as claimed in claim 1 wherein the line is a loaded telephone subscriber line.

4. Apparatus as claimed in claim 1 wherein each of the pilot tone frequencies is less than 180 Hz.

5. Apparatus as claimed in claim 4 wherein each of the pilot tone frequencies is greater than 60 Hz.

6. Apparatus as claimed in claim 5 wherein each of the pilot tone frequencies is less than 120 Hz.

7. Apparatus as claimed in claim 5 wherein the line is a loaded telephone subscriber line and the means for transmitting information via the line when the telephone is on-hook comprises voice-band modems coupled to the line at the first and second ends.

8. Apparatus as claimed in claim 2 wherein the means for monitoring the pilot tone and the modem coupled to the line at the second end are provided commonly for a plurality of telephone subscriber lines, the apparatus comprising switching means for selectively connecting the means for monitoring the pilot tone and the modem to each of said lines.

9. Apparatus comprising:
a telephone subscriber line connected at a first end to a telephone and at a second end to a central office;
first and second hook state detection means coupled to the line at respectively the first and second ends for determining whether the telephone is on-hook or off-hook;
means, responsive to the hook state detection means determining that the telephone is on-hook, for transmitting information via the line;
means, responsive to the first hook state detection means determining that the telephone is off-hook, for applying a pilot tone to the line at the first end;
first ringing signal detection means coupled to the line at the first end for detecting the presence of ringing signals on the line;
control means for selecting one of two frequencies of the pilot tone, applied to the line when the telephone goes off-hook, in dependence upon the detection of the presence of ringing signals; and
means, responsive to the second hook state detection means determining that the telephone is off-hook, for monitoring the pilot tone at the second end of the line.

10. Apparatus as claimed in claim 9 wherein each hook state detection means comprises means, having a high input impedance, coupled to the line for monitoring the d.c. voltage across the line.

11. Apparatus as claimed in claim 9 wherein the second hook state detection means is responsive to dial pulses on the line to inhibit the means for monitoring the pilot tone during the dial pulses.

12. Apparatus as claimed in claim 9 and including second ringing signal detection means, coupled to the line at the second end, each of the first and second ringing signal detection means being responsive to the presence of ringing signals on the line to inhibit the means for transmitting information via the line during ringing signals.

13. Apparatus as claimed in claim 9 wherein said two frequencies of the pilot tone are between 60 Hz and 120 Hz.

14. Apparatus as claimed in claim 9 and including control means responsive to the second hook state detection means and to the monitoring means for causing the transmitting means to transmit interrogating information via the line in response to a change in or loss of the monitored pilot signal while the second hook state detection means determines that the telephone is off-hook.

15. Apparatus as claimed in claim 14 wherein the control means includes means for temporarily interrupting the connection of the line at the second end to the central office during transmission of the interrogating information.

16. Apparatus as claimed in claim 14 wherein the control means is responsive to the monitoring means detecting a shifted frequency of the monitored pilot tone to cause transmission of the interrogating information, and including control means for causing the shifted frequency pilot tone to be applied to the line at the first end in response to a predetermined condition occurring while the first hook state detection means determines that the telephone is off-hook.

17. Apparatus as claimed in claim 9 wherein the transmitting means comprises first and second modems coupled to the line at respectively the first and second ends.

18. Apparatus as claimed in claim 17 wherein the line is a loaded telephone subscriber line and the modems are voice-band modems.

19. Apparatus as claimed in claim 17 and including control means responsive to the second hook state detection means determining that the telephone is off-hook for decoupling the second modem from the second end of the line.

20. Apparatus as claimed in claim 17 and including control means responsive to the first hook state detection means determining that the telephone is off-hook for including a series impedance in the coupling between the first modem and the first end of the line.

21. Apparatus as claimed in claim 17 wherein the second hook state detection means, the means for monitoring the pilot tone, and the second modem are provided commonly for a plurality of telephone subscriber lines, the apparatus comprising switching means for selectively connecting the second hook state detection means, the means for monitoring the pilot tone, and the second modem to the second end of each of said lines.

22. Apparatus as claimed in claim 14 wherein the control means, the second hook state detection means, the means for monitoring the pilot tone, and the second modem are provided commonly for a plurality of telephone subscriber lines, the apparatus comprising switching means for selectively connecting the second hook state detection means, the means for monitoring the pilot tone, and the second modem to the second end of each of said lines.

23. Apparatus as claimed in claim 22 wherein the switching means comprises a first switch for selectively connecting the second hook state detection means to the second end of each of said lines and a second switch for simultaneously connecting at least one of the means for monitoring the pilot tone and the second modem to the second end of the respective one of said lines.

24. Apparatus as claimed in claim 23 wherein the control means includes means for temporarily interrupting the connection of the respective line at the second end to the central office during transmission of the interrogating information.

25. Apparatus as claimed in claim 24 wherein the means for temporarily interrupting the connection of the respective line during transmission of the interrogating information comprises relay means in respect of each line, the relay means being responsive to a d.c. signal produced by the control means during transmission of the interrogating information to connect an impedance across the respective line at its second end, thereby to maintain any telephone connection established for the line via the central office, and to open the line between said impedance and the coupling of the line to the first and second switches, the d.c. signal produced by the control means being applied to the respective relay means via the second switch.

26. Apparatus as claimed in claim 12 and including first and second high input impedance buffers coupled to the line at respectively the first and second ends, wherein the first and second hook state detection means and the first and second ringing signal detection means are coupled to outputs of respectively the first and second buffers.

27. Apparatus as claimed in claim 26 and including first and second a.c. coupling networks coupled to the line at respectively the first and second ends, wherein the means for transmitting information comprises first and second modems coupled to the line via respectively the first and second a.c. coupling networks, and wherein the means for applying the pilot tone and the means for monitoring the pilot tone are coupled to the line via respectively the first and second a.c. coupling networks.

28. Apparatus as claimed in claim 27 and including control means responsive to the second hook state detection means determining that the telephone is off-hook for decoupling the second modem from the second end of the line.

29. Apparatus as claimed in claim 27 and including control means responsive to the first hook state detection means determining that the telephone is off-hook for including a series impedance in the coupling between the first modem and the first end of the line.

30. Apparatus as claimed in claim 28 wherein the control means, the second hook state detection means, the second ringing signal detection means, the means for monitoring the pilot tone, and the second modem are provided commonly for a plurality of telephone subscriber lines, the apparatus comprising a first switch for selectively connecting the second hook state detection means and the second ringing signal detection means to the second buffer of each of said lines and a second switch for simultaneously connecting at least one of the means for monitoring the pilot tone and the second modem to the second a.c. coupling network of the respective one of the lines, said switches being controlled by the control means.

31. Apparatus as claimed in claim 30 wherein the control means is responsive to the second hook state detection means and to the monitoring means for causing the second modem to transmit interrogating information via the line selected by the switches in response to a change in or loss of the monitored pilot signal on that line while the second hook state detection means determines that the telephone connected to that line is off-hook.

32. Apparatus as claimed in claim 31 wherein the control means includes means for temporarily interrupting the connection of the respective line at the second end to the central office during transmision of the interrogating information.

33. Apparatus as claimed in claim 32 wherein the means for temporarily interrupting the connection of the respective line during transmission of the interrogating information comprises relay means in respect of each line, the relay means being responsive to a d.c. signal produced by the control means during transmission of the interrogating information to connect an impedance across the respective line at its second end, thereby to maintain any telephone connection established for the line via the central office, and to open the line between said impedance and the coupling of the line to the second buffer and a.c. coupling network, the d.c. signal produced by the control means being applied to the respective relay means via the second switch.

34. Apparatus as claimed in claim 33 wherein each of the lines is a loaded telephone subscriber line.

35. Apparatus for connection to a telephone subscriber line comprising:
 a high input impedance buffer having an input for connection to the line;
 a hook state detector, having an input coupled to an output of the buffer, for determining whether a telephone connected to the line is on-hook or off-hook;
 means for transmitting and receiving information via the line when the hook state detector determines that the telephone is on-hook;
 means for generating a pilot tone when the hook state detector determines that the telephone is off-hook;
 coupling means for coupling the pilot tone generating means and the information transmitting and receiving means to the line;
 a ringing signal detector, having an input coupled to the output of the buffer, for detecting the presence of ringing signals on the line; and
 control means for selecting one of two frequencies of the pilot tone, to be generated by the pilot tone generating means when the telephone goes off-hook, in dependence upon the detection of the presence of ringing signals by the ringing signal detector.

36. Apparatus as claimed in claim 35 wherein the control means is responsive to the detection of the presence of ringing signals by the ringing signal detector to inhibit the information transmitting and receiving means during ringing signals.

37. Apparatus as claimed in claim 35 wherein the information transmitting and receiving means comprises a voice-band modem.

38. Apparatus as claimed in claim 37 wherein the control means is responsive to the hook state detector determining that the telephone is off-hook for including a series impedance in the coupling of the modem to the line.

39. Apparatus as claimed in claim 37 wherein each of the pilot tone frequencies is between 60 Hz and 180 Hz.

40. Apparatus as claimed in claim 35 wherein the control means is responsive to a predetermined condition occurring while the hook state detector determines that the telephone is off-hook to cause the pilot tone generating means to generate the pilot tone with a shifted frequency.

41. Apparatus for connection to a telephone subscriber line comprising:
a high input impedance buffer having an input for connection to the line;
a hook state detector, having an input coupled to an output of the buffer, for determining whether a telephone connected to the line is on-hook or off-hook;
means for transmitting and receiving information via the line when the hook state detector determines that the telephone is on-hook;
means for generating a pilot tone when the hook state detector determines that the telephone is off-hook;
coupling means for coupling the pilot tone generating means and the information transmitting and receiving means to the line; and
control means for causing the pilot tone generating means to generate the pilot tone with a shifted frequency in response to a predetermined condition occurring while the hook state detector determines that the telephone is off-hook.

42. Apparatus comprising:
a telephone subscriber line connected at a first end to a telephone and at a second end to a central office;
first and second hook state detection means coupled to the line at respectively the first and second ends for determining whether the telephone is on-hook or off-hook;
means, responsive to the hook state detection means determining that the telephone is on-hook, for transmitting information via the line;
means, responsive to the first hook state detection means determining that the telephone is off-hook, for applying a pilot tone to the line at the first end;
means, responsive to the second hook state detection means determining that the telephone is off-hook, for monitoring the pilot tone at the second end of the line;
first control means for causing the pilot tone to be applied to the line at the first end with a shifted frequency in response to a predetermined condition occurring while the first hook state detection means determines that the telephone is off-hook; and
second control means responsive to the second hook state detection means and to the monitoring means for causing the transmitting means to transmit information via the line in response to detection of the shifted frequency or loss of the monitored pilot signal while the second hook state detection means determines that the telephone is off-hook.

* * * * *